J. H. BENNETT.
GREASE CUP.
APPLICATION FILED MAR. 5, 1914.
1,108,680.
Patented Aug. 25, 1914.
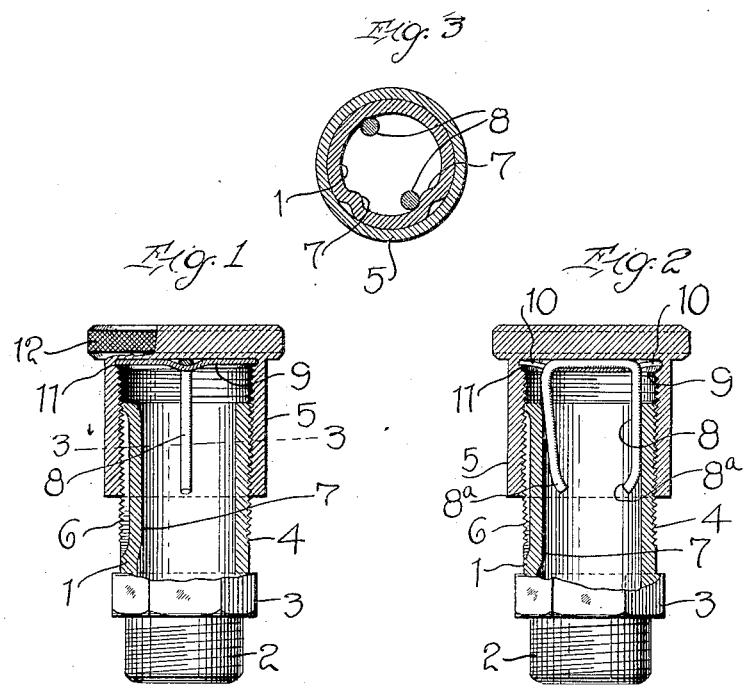
Witnesses
Robert M. Sutphen
A. L. Hind
Inventor,
J. H. Bennett
By Frederick S. Still
Attorney

UNITED STATES PATENT OFFICE.

JOHN H. BENNETT, OF WORCESTER, MASSACHUSETTS.

GREASE-CUP.

1,108,680.  Specification of Letters Patent.  Patented Aug. 25, 1914.

Application filed March 5, 1914. Serial No. 822,646.

*To all whom it may concern:*

Be it known that I, JOHN H. BENNETT, a citizen of the United States, residing at Worcester, in the county of Worcester and State of Massachusetts, have invented certain new and useful Improvements in Grease-Cups, of which the following is a specification.

This invention comprehends certain new and useful improvements in grease cups of the type that are provided with a rotatable cover or cap and a spring locking device or detent for preventing the cap from becoming loose or backing off, and the invention has for its primary object a simple, durable and efficient construction of device of this character, the parts of which may be very cheaply manufactured and readily assembled at a minimum of time and cost.

A further object of the invention is a device of this character in which the parts are so constructed and arranged that the locking device or detent may be very easily secured in place without the necessity of any machine work and whereby material economies in manufacture are secured. And the invention also aims to generally improve devices of this class so as to render them more useful and commercially desirable.

With these and other objects in view as will more fully appear as the description proceeds, the invention consists in certain constructions, combinations and arrangements of the parts that I shall more fully describe and claim.

For a full understanding of the invention, reference is to be had to the following description and accompanying drawing, in which—

Figure 1 is a sectional view of a grease cup constructed in accordance with my invention, parts being shown in side elevation. Fig. 2 is a similar view at right angles to Fig. 1. Fig. 3 is a horizontal sectional view, the section being taken approximately on the line 3—3 of Fig. 1. Fig. 4 is a side elevation of the body portion of the cup. Fig. 5 is a detail view of the locking device or detent and the disk which secures it in place, the disk being shown in its initial dished condition, and Fig. 6 is a top plan view of the disk with the locking device mounted therein.

Corresponding and like parts are referred to in the following description and designated in all of the views of the accompanying drawing by like reference characters.

Referring to the drawing, the numeral 1 designates the body portion of my improved grease cup, the same being provided with the usual threaded nipple 2, polygonal boss 3 and exterior screw threads 4, said body portion being of any desired construction, shape or design, except as hereinafter noted. 5 designates the cap which is formed with interior screw threads to engage the exterior screw threads 4 of the body portion 1, the cap also being of any desired construction or design, except as hereinafter specified.

In carrying out my invention, I produce in the body portion 1 and on the threaded part 4 thereof, any desired number of longitudinally disposed grooves 6, which produce interior longitudinally disposed ribs 7, as clearly illustrated in Fig. 3. In the present instance, I have shown two of these ribs, the same being arranged in quartered relation to each other, but it is to be understood that the invention is not limited to this or any other number or particular disposition of the ribs. It is to be particularly noted that the ribs 7, which are produced by pressing the grooves 6 into the metal, terminate short of the upper edge of the body portion whereby the thread is full at the top edge of the cup in order to keep the grease from coming out as it might if the ribs were extended clear to the top.

The locking member or detent 8 may be very cheaply formed of round wire, the same being bent into substantially inverted U-shape and the extremities being preferably turned inwardly slightly so as to admit of a free entry into the body portion 1. In connection with the locking member 8, I provide a disk or washer 9 which, in its initial formation is dished or cupped-shape, as clearly illustrated in Figs. 5 and 6. This disk is provided at diametrically opposite points in its edge with notches or recesses 10 to receive the two arms of the locking member 8, said arms being inserted down into and through the edge recesses 10 until the cross bar or connecting portion of the locking member is reached, as clearly illustrated in Figs. 5 and 6.

The disk or washer 9 in its cupped or dished condition and with the locking member 8 connected thereto, as illustrated in Fig. 5, is inserted into the cup 5 until it abuts against the top thereof, and finally lodges in a groove 11 which is formed in the cup contiguous to the knurled or milled flange top 12. Pressure is then applied to the disk the same tending to flatten the disk out and cause its firm engagement with the grooved interior wall of the cup, this pressure being sufficient to cause the disk or washer 9 to securely hold itself in place, without and independent fastening device. It will thus be seen that the parts may be very cheaply manufactured and assembled and without any machine work at all, whereby the cups may be made at a very low cost.

From the foregoing description in connection with the accompanying drawing, the operation of my improved grease cup will be apparent. When the cup 5 is screwed onto the threaded portion 4 of the body 1, the arms of the locking member 8 will engage the ribs 7 with spring pressure and the cup will be effectually prevented from becoming loose or backing off. In the present embodiment of the invention, with the ribs 7 arranged in quartering relation to each other, and with the double or two-armed spring locking member 8, the device will lock at every quarter turn and, as above stated, all liability of the cap becoming loose or accidentally backing off will be precluded.

While the accompanying drawing illustrates what I believe to be the preferred embodiment of my invention, it is to be understood that the invention is not limited thereto but that various changes may be made in the construction, arrangements and proportions of the parts without departing from the scope of the invention as defined in the appended claims.

What is claimed, is:

1. A grease cup of the character described, including a body portion, a cap mounted thereon, a locking member within the cap and movable therewith and engageable with the body portion for the purpose specified, and a disk-like washer engaging the wall of the cap underneath the top thereof and extending across the top from one side to the other and holding the locking member in place.

2. A grease cup of the character described, including a body portion, a rotatable cap mounted thereon, a locking member within the cap and movable therewith and engageable with the body portion, for the purpose specified, and a flat disk washer having its edge engaged with the interior side wall of the body portion, and holding said locking member in place.

3. A grease cup of the character described, including a body portion, a rotatable cap mounted thereon, a locking member mounted within the cap and movable therewith and engageable with the body portion, for the purpose specified, and a notched washer connected to said locking member and engaging the wall of the cap to hold itself and the locking member in place.

4. A grease cup of the character described, including a body portion, a rotatable cap mounted thereon, a locking member of U formation mounted within the cap and engageable with the body portion, for the purpose specified, and a notched disk of ductile metal extending across the locking member and engaging the wall of the cap whereby to hold itself and the locking member in place.

5. A grease cup of the character described, including an exteriorly threaded body portion formed with longitudinally disposed interior ribs, an internally threaded cap adapted to screw on the body portion, a locking member of U formation mounted within the cap and engageable with said ribs, for the purpose specified, and a notched disk extending across the cross bar of said locking member, the arms of the latter being received in the notches of the disk and said disk engaging the inner wall of the cap whereby to hold itself and the locking member in place.

6. A grease cup of the character described, including an exteriorly threaded body portion formed with longitudinally disposed interior ribs, an internally threaded cap adapted to screw on the body portion, a locking member of U formation mounted within the cap and engageable with said ribs, for the purpose specified, and a notched disk extending across the cross bar of said locking member, said ribs terminating short of the upper edge of the body portion, as and for the purpose set forth.

7. A grease cup of the character described, including a body portion, a cap therefor, a locking member within the cap and movable therewith and engageable with the body portion, of a flat washer mounted within the cap and engaging with its edge the interior side wall thereof underneath and in contact with the top of the cap and holding said locking member between it and the underside of the top, said washer being formed with an opening through which the locking member extends.

8. A grease cup of the character described, including a body portion, a cap therefor, a locking member of U formation mounted within the cap and engageable with the body portion, for the purpose specified, and a washer of ductile metal engaging the wall of the cap to hold itself in position, the washer being formed with spaced openings through which the arms of the locking member pass.

9. A grease cup of the character described, including a body portion, a cap therefor, a locking member mounted within the cap and engageable with the body portion, for the purpose specified, the cap being formed in its interior wall and contiguous to the underside of the top thereof with an annular groove, a disk washer of ductile-metal adapted to be spread against the top of the cap within the latter, whereby its edge will engage in said groove and hold the washer in place, the locking member being confined between said washer and the under side of the top and the washer being formed with an opening through which the locking member extends.

In testimony whereof I affix my signature in presence of two witnesses.

JOHN H. BENNETT.

Witnesses:
SAMUEL G. NASH,
CHARLES S. DODGE.